(12) United States Patent
Vachon

(10) Patent No.: US 12,729,673 B2
(45) Date of Patent: Sep. 8, 2026

(54) FLOW STREAM FILTERING METHOD AND SYSTEM

(71) Applicant: LE GROUPE DSD INC., Thetford Mines (CA)

(72) Inventor: Léandre Vachon, Thetford Mines (CA)

(73) Assignee: LE GROUPE DSD INC., Thetford Mines (CA)

( * ) Notice: Subject to any disclaimer, the term of this patent is extended or adjusted under 35 U.S.C. 154(b) by 100 days.

(21) Appl. No.: 18/858,514

(22) PCT Filed: May 3, 2023

(86) PCT No.: PCT/CA2023/050601
§ 371 (c)(1),
(2) Date: Oct. 21, 2024

(87) PCT Pub. No.: WO2023/215969
PCT Pub. Date: Nov. 16, 2023

(65) Prior Publication Data
US 2025/0277486 A1 Sep. 4, 2025

(30) Foreign Application Priority Data
May 13, 2022 (CA) ................................ CA 3158810

(51) Int. Cl.
*F04B 39/16* (2006.01)
*B01D 46/00* (2022.01)
*B01D 46/24* (2006.01)

(52) U.S. Cl.
CPC .......... *F04B 39/16* (2013.01); *B01D 46/0031* (2013.01); *B01D 46/2403* (2013.01); *B01D 2273/28* (2013.01)

(58) Field of Classification Search
CPC .......... F04B 39/16; F04B 53/20; F04B 37/10; B01D 46/0031; B01D 46/2403; B01D 2273/28; B01D 46/58
See application file for complete search history.

(56) References Cited

U.S. PATENT DOCUMENTS 5,586,996 A * 12/1996 Manookian, Jr. .. B01D 46/2411 123/573
6,200,367 B1 * 3/2001 Phillips ............. B01D 46/0086 96/417

(Continued)

FOREIGN PATENT DOCUMENTS

EP 0551951 7/1995
WO 01/68220 9/2001
WO WO-0168220 A1 * 9/2001 ............. B01D 46/69

OTHER PUBLICATIONS

European Search Report and Written Opinion issued in corresponding EP application No. 23802380.8 dated Aug. 4, 2025.

(Continued)

*Primary Examiner* — Matthew T Largi
(74) *Attorney, Agent, or Firm* — Gwendoline Bruneau; Lavery, de Billy, L.L.P.

(57) ABSTRACT

A filter system operating under vacuum conditions, comprising a filter section comprising filter elements of a number and a size selected to optimize a flow stream volume within the filter section and a contact surface between the flow stream and surfaces of the filter elements and to optimize flow of a liquid phase captured from the flow stream along the surfaces of the filter elements, and configured to capture the liquid phase from the flow stream, and direct the liquid phase from the filter section to a flow stream input section, which directs the liquid phase out of the (Continued)

system at a liquid output thereof, the system delivering a filtered flow stream from a flow stream output section at a flow stream output thereof.

20 Claims, 14 Drawing Sheets

(56) References Cited

U.S. PATENT DOCUMENTS

2005/0040086 A1* 2/2005 Jensen ................. B01D 37/046
210/120
2005/0235617 A1* 10/2005 Read .................. B01D 46/2414
55/482
2018/0339255 A1* 11/2018 Gottlieb ................. B01D 46/58
2024/0151170 A1* 5/2024 Howarth ............ B01D 46/2411

OTHER PUBLICATIONS

International Search Report and Written Opinion issued in corresponding PCT application No. PCT/CA2023/050601 on Jul. 10, 2023.

* cited by examiner

FLOW STREAM FILTERING METHOD AND SYSTEM

CROSS-REFERENCE TO RELATED APPLICATIONS

This application is a National Entry Application of PCT application no PCT/CA2023/050601 filed on May 3, 2023 and published in English under PCT Article 21 (2), which itself claims benefit of Canadian application Serial No. 3, 158,810, filed on May 13, 2022. All documents above are incorporated herein in their entirety by reference.

FIELD OF THE INVENTION

The present invention relates flow stream filtering. More specifically, the present invention is concerned with a flow stream filtering method and system.

BACKGROUND OF THE INVENTION

Maple sugaring refers generally to the harvesting and the processing of tree sap, especially from sugar maples, into various products. A sugar bush is a wooded area where there are many sugar maples and where it is possible to harvest the sap of these trees in massive quantities at certain times of the year, mainly in the spring. The sap may be harvested by drilling a hole in the trunk of a tree and by installing a corresponding spout through which the sap will flow under suitable weather conditions.

An efficient way of harvesting sap, which is also the least invasive or damaging to trees, is to use a small-diameter tap hole and a corresponding spout connected to a tubing network that allows the sap to be transported towards a destination point, for instance a reservoir, a tank or any other suitable location. Vacuum is used to increase the harvesting yield, attaching a vacuum pump to the tubing network tubing system to will significantly boost increasing the difference in pressure. The interior of the tubing network is thus under a vacuum when sap is harvested, namely that the absolute pressure therein is below the ambient atmospheric pressure (i.e., sub atmospheric), and it is desirable that the tubing network is perfectly airtight everywhere. The relative pressure differential between the interior and the exterior of the tubing is referred to hereafter as a negative pressure. This negative pressure is created by one or more vacuum pumps provided at the downstream end of the tubing network.

The tubing of a tubing network generally comprises a number of interconnected conduits made of tube and pipe segments, and which are increasingly larger in diameter towards the downstream end. In maple sugaring, the conduits at the upstream ends are usually tubes made of a relatively flexible material. They are also often installed at a given height above the ground because it is desirable that the tubing network be generally sloping substantially downward towards the destination point, thereby allowing the sap to move under the combined action of gravity and the negative pressure.

There are many different things that may cause an accidental rupture of a conduit or otherwise suddenly create a significant opening or breach through which air may now easily enter the tubing network when sap is harvested. Examples comprise falling trees or branches, or even someone or something, such as a vehicle or an animal, passing through the sugar bush and inadvertently causing one or more conduits to be ruptured or their junctions to be detached. Spouts may also become dislodged from their corresponding tap holes for several reasons. Other situations exist as well.

When a significant opening is abruptly created somewhere in the tubing network and its airtightness is compromised, the sap already present inside the tubing network may be driven to flow at an abnormally fast rate because the air now coming through the opening or breach fails to hold back and slow down the flow of sap towards the downstream end, thus towards the vacuum pump or pumps. Some of the sap arriving too fast at the downstream end may then flood and/or bypass the reservoir or tank, and continue further down the vacuum line and reach the air inlet of a running vacuum pump. Such liquid entering the air inlet causes damages, especially if this occurs while the vacuum pump is running. Large vacuum pumps such as the ones for use in sugar bushes generally require a substantial initial investment to purchase them; they are complex machines, and repairing them may be very costly, particularly after being damaged by an intake of a liquid containing a certain concentration of sugar. Also, the sap harvesting season being often noticeably short, any downtime of the equipment during the season will most likely result in significant economic losses.

There is still room for a flow stream filtering method and system.

SUMMARY OF THE INVENTION

More specifically, in accordance with the present invention, there is provided a filter system operating under vacuum conditions, comprising a flow stream input section, connected to a source of flow stream; a filter section connected to the flow stream input section; and a flow stream output section connected with the filter section; wherein the flow stream input section receives, at a flow stream inlet port thereof, from the source of flow stream, a flow stream comprising at least one of air, water, airborne droplets, moisture and gases, and directs the flow stream to the filter section, and from the filter section to the flow stream output section, the system delivering a filtered flow stream from the flow stream output section at a flow stream output thereof; the filter section comprises filter elements, a number and a size of the filter elements being selected to optimize a flow stream volume within the filter section and a contact surface between the flow stream and surfaces of the filter elements, and to optimize flow of a liquid phase along the surfaces of the filter elements; the filter elements capture a liquid phase from the flow stream, and direct the liquid phase from the filter section to the flow stream input section, the flow stream input section directing the liquid phase out of the system at a liquid output thereof.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

In the present disclosure, the word "water" and related terms are used when referring to a liquid phase. This is only for the sake of simplicity and brevity, and it does not limit the present invention to embodiments involving plain water or a liquid mainly consisting of water, such as sap collected from trees, or mixtures of air and vapor in milking processes. Accordingly, the word "water" and related terms do not exclude other liquid matter, including liquid matter without any water. Likewise, the present disclosure uses the word "air" and related terms when referring to a gas. This is only for the sake of simplicity and brevity, and it does not limit the present invention to embodiments involving air or a gas mainly consisting of air. Accordingly, the word "air" and related terms do not exclude other gaseous matter, including gaseous matter without air or its major constituents, as occurring during processing in the oil industry, in plastic forming such as pultrusion for example and chemical fields for example. The system presented for protecting vacuum pumps may be applied to compressors or others machine tools; others usage are possible.

Figure 1:
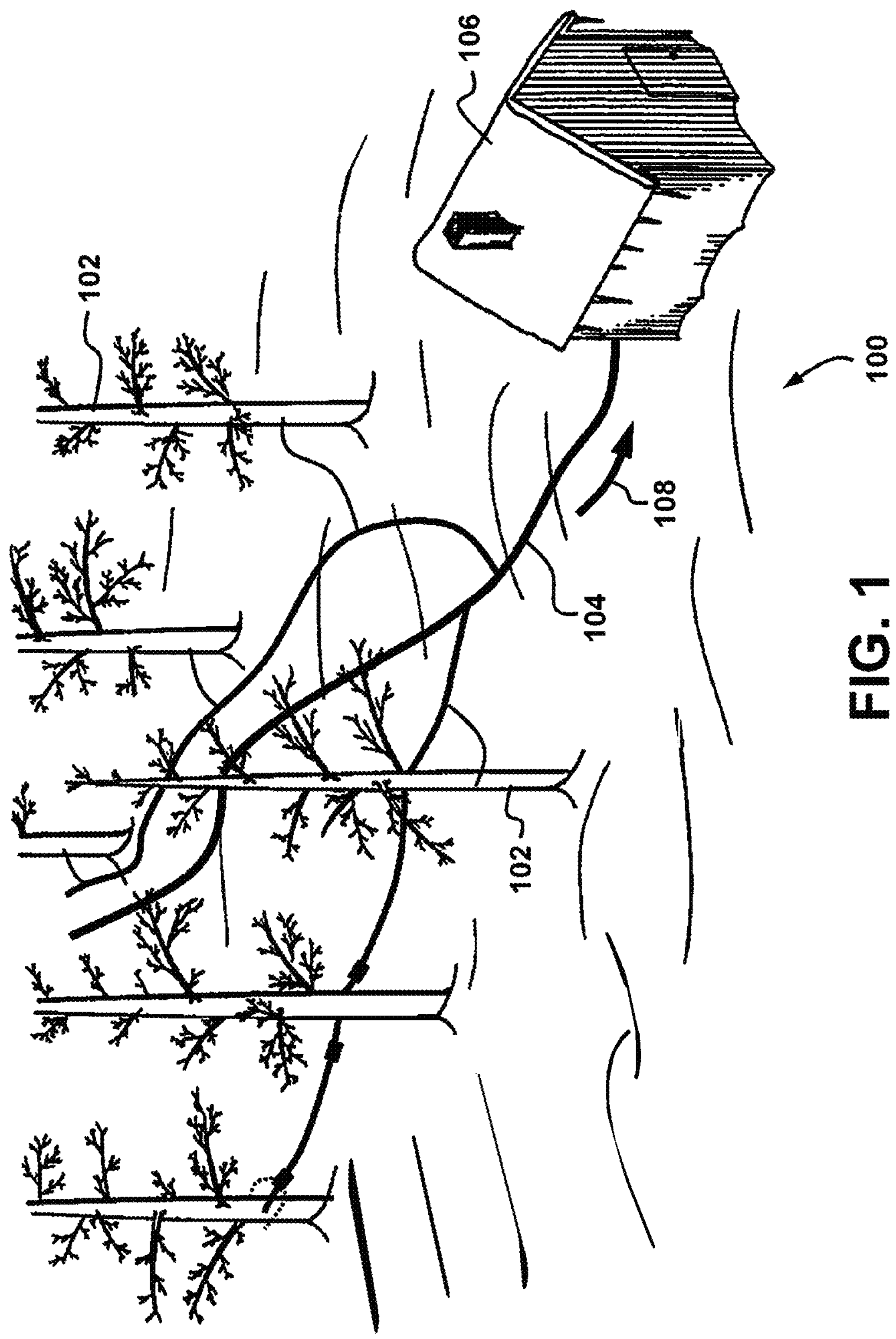
FIG. 1 is a schematic view of a facility for harvesting sap from trees.

FIG. 1 is a schematic view of a typical facility 100 for harvesting sap from sugar maples 102. The sap is harvested at each tree using a spout inserted in a corresponding tap hole provided through a tree trunk. Each spout is connected to a tubing network 104 directing the sap along a flow direction 108 a reservoir, a tank, or any other suitable container or equipment, typically into a building 106 located at the downstream end of the tubing network 104. The interior of the tubing network 104 is under a negative pressure to help the flow towards the building 106 in addition to gravity, using a vacuum pump provided at the downstream end of the tubing network 104, for instance, inside the building 106. Other configurations are possible.

The generic facility 100 shown in FIG. 1 is very simplified, and it is used only for the sake of example. Sugar bushes may comprise several thousand trees, and a plurality of tubing networks, A number of species of trees have a sap whose sugar content makes it possible to obtain products similar to those of the maple sugar industries, for instance yellow birch, sugar birch, hickory, basswood, etc. However, maple sugaring is more common, and the present disclosure refers to maple sap harvest for illustrative purposes.

The tubing network is normally airtight everywhere, in such a way to control the flow of sap towards the downstream end, for example. There are many different things that may accidentally result in a rupture of a conduit or otherwise result in air entering the tubing network during harvesting operations, which may cause the sap inside the tubing network to flow at an increased rate towards the downstream end, and sap at the downstream end may overflowing or even simply bypassing the equipment to reach the air inlet of the vacuum pump at the end of the vacuum line.

Even when there is no flooding event or the like, air drawn by a vacuum pump may still contain water in the form of small droplets or water vapor. Although a vacuum pump may operate normally even if the incoming air is not entirely dry, water may slowly enter the lubricating oil circuit of a vacuum pump and over a given time period accumulate in the lubricating oil reservoir. A large vacuum pump, such as used in dairy farms for instance, typically contains a significant quantity of lubricating oil in its lubricating oil reservoir, for instance 45 liters or even more. Water may quickly accumulate after a few weeks, sometimes even after just a few days, and an accumulation of a few liters of water is not uncommon. The presence of water may degrade the lubricating oil and may result in damages to the vacuum pump, particularly if the liquid level reaches the inlet of the lubricating oil circuit in the reservoir. Moreover, water removed from a lubricating oil reservoir is contaminated and requires a proper treatment. A certain quantity of oil is lost during each water drainage operation, and additional oil is then needed.

Figure 2:
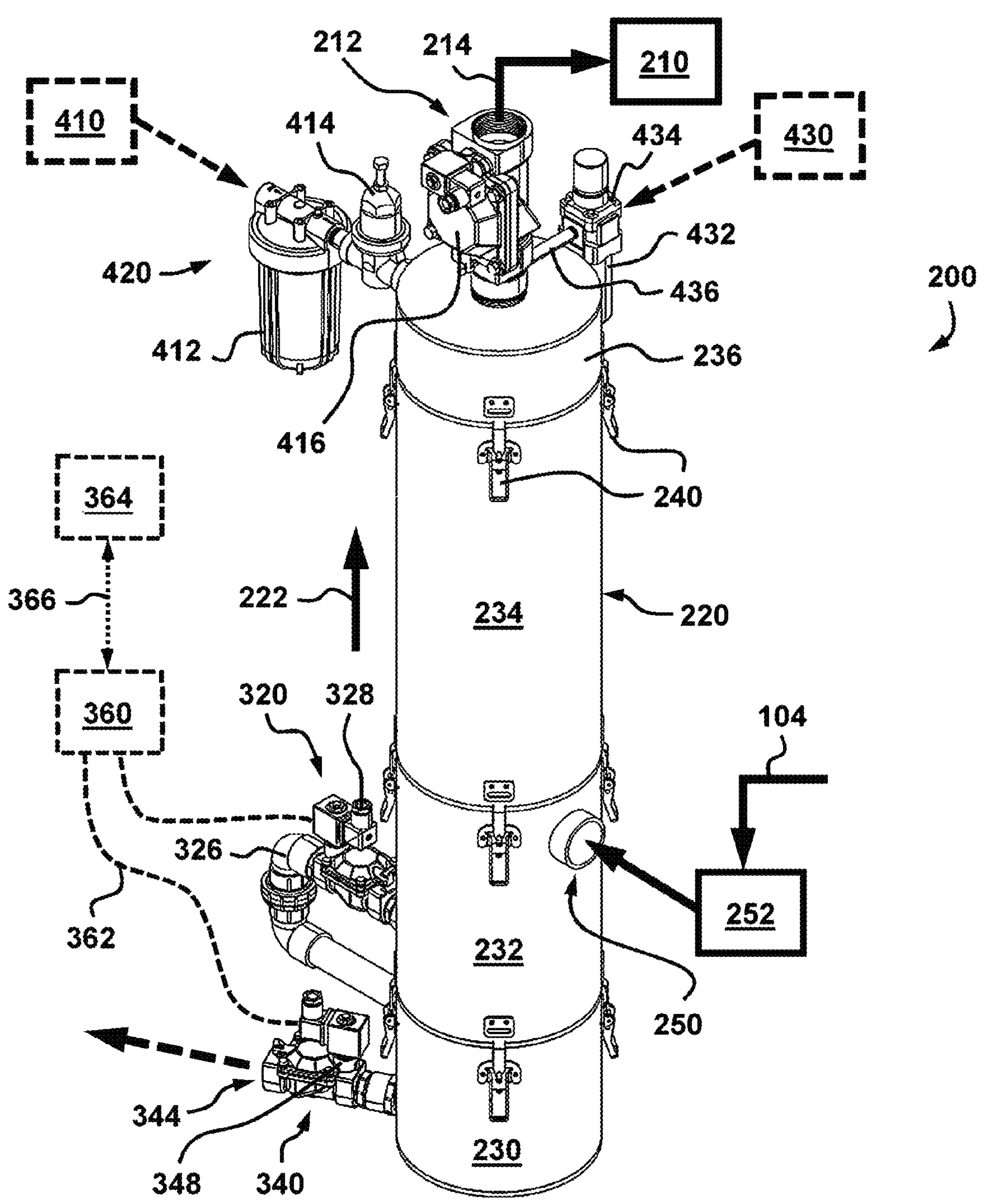
FIG. 2 is a schematic view of a filter system according to an embodiment of the present disclosure.

A filter system 200 according to an embodiment of an aspect of the present disclosure is illustrated in FIG. 2, is connected to a vacuum pump 210, so that the interior of the system 200 is under a negative pressure when the vacuum pump 210 is running. An air outlet 212 of the top of the filter system 200 is connected to the air inlet of the vacuum pump 210 by a vacuum line 214 for example. The air outlet 212 may be positioned at the top filter system 200 as illustrated, or on a lateral wall thereof for example. Other variants are possible.

The system 200 illustrated in FIG. 2 comprises a vessel 220, made in a material selected according to the nature of the flow stream to be treated and environment of the application, metallic and/or non-metallic materials, selected with a soft or polished surface allowing liquid dripping along. The vessel 220 generally extends vertically, although other inclination in relation to a vertical axis (see vertical axis 222) are possible. The vessel 220 may comprise a plurality of stacked sections 230, 232, 234, 236, of a substantially circular cross-section, coaxially positioned with reference to the longitudinal axis 222, as shown. Other configurations are possible. For example, one or more of the sections may have a different design and/or relative size. One or more of the sections may have a non-circular cross-section, and/or one or more of the sections may be stacked differently, for instance not coaxially positioned with reference to one or more other sections. The number of sections may be different. The system may also be constructed without having visibly distinct sections. Other variants are possible as well.

The sections 230, 232, 234, 236 may be removably connected to one another using mechanical fasteners, such as self-locking clamps 240 as shown on the exterior surface of the vessel 220. There are three sets of self-locking clamps 240 in the illustrated example, including a first set between a sump section 230 and a flow stream input section 232, a second set between the flow stream input section 232 and a filter section 234, and a third set is between the filter section 234 and output section 236, each set comprising four self-locking clamps 240. The negative pressure inside the system 200 also contributes to keep the sections connected together. Other configurations are possible. For example, other pressure-resistant fasteners or types of fasteners may be used between some of the sections. The connection between one or more of the sections may be made permanent, for instance by gluing or welding. Other variants are possible as well.

The vessel 220 comprises an inlet port 250, shown as a circular opening in a lateral wall thereof of the flow stream input section 232 at a given height from the bottom of the vessel 220 in the embodiment illustrated FIG. 2. From the inlet port 250 an input flow stream coming from another system or equipment to the filter section. For example, for example, returning to the example illustrated in FIG. 1, the inlet port 250 may be in communication with a tank 252 receiving maple water from the tubing network 104. The input flow stream coming through the inlet port 250 is normally air comprising some water in the form of airborne droplets and/or moisture. The input flow stream may be partly or entirely liquid water. Other configurations are possible. For example, the inlet port may not necessarily be circular in all implementations. The system may receive a flow stream from an upstream equipment or device other than a tank or a tubing network. Other variants are possible as well.

According to an embodiment of an aspect of the present disclosure as described hereinbelow in relation to FIGS. 1-10, the flow stream input section 232 leads the input flow stream to the filter section 234 and then through the output section 236 to exit the system as filtered flow stream to a vacuum pump (through top chamber 392), the sump 230 in liquid communication with the flow stream input section 232 being an option.

Figure 3:
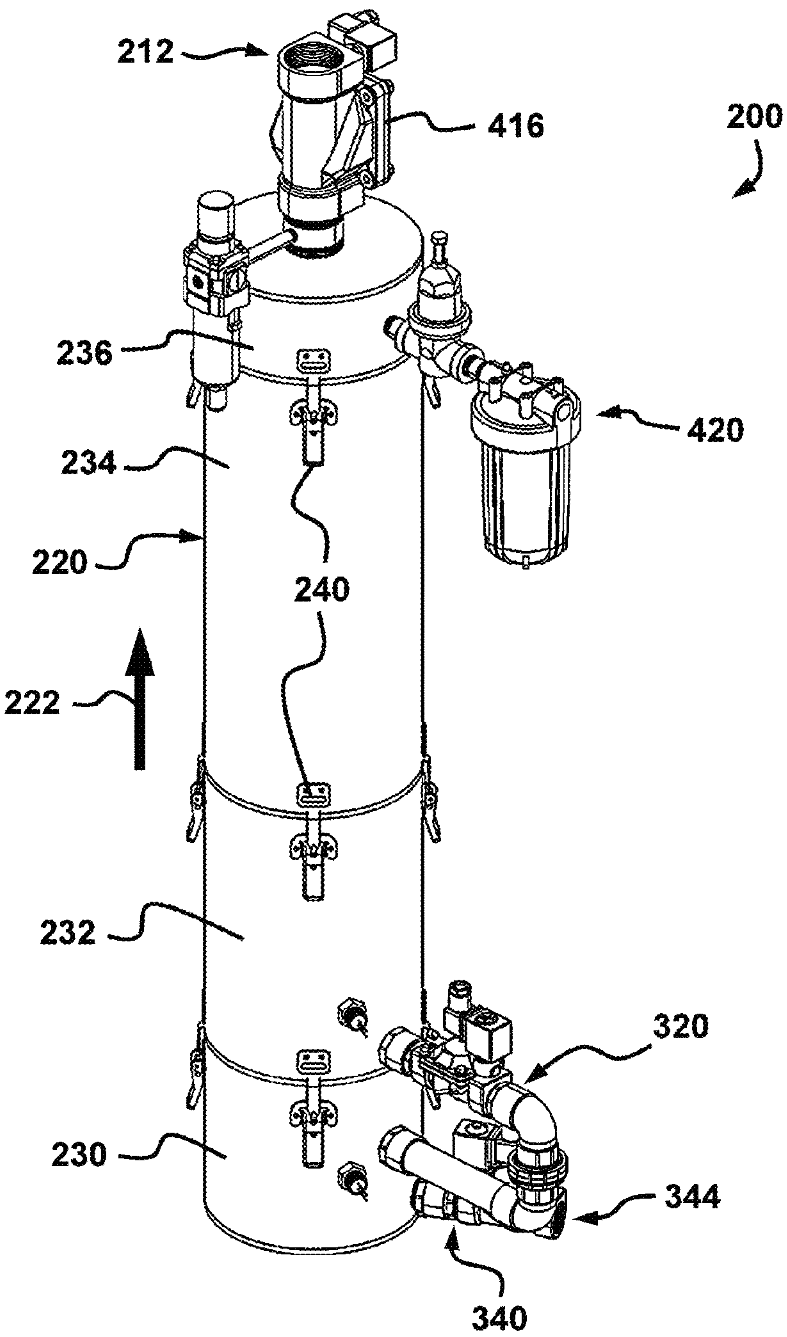
FIG. 3 is a schematic view of the filter system of FIG. 1.

FIG. 3 is an isometric view illustrating the system 200 of FIG. 1 from another viewpoint.

Figure 4:
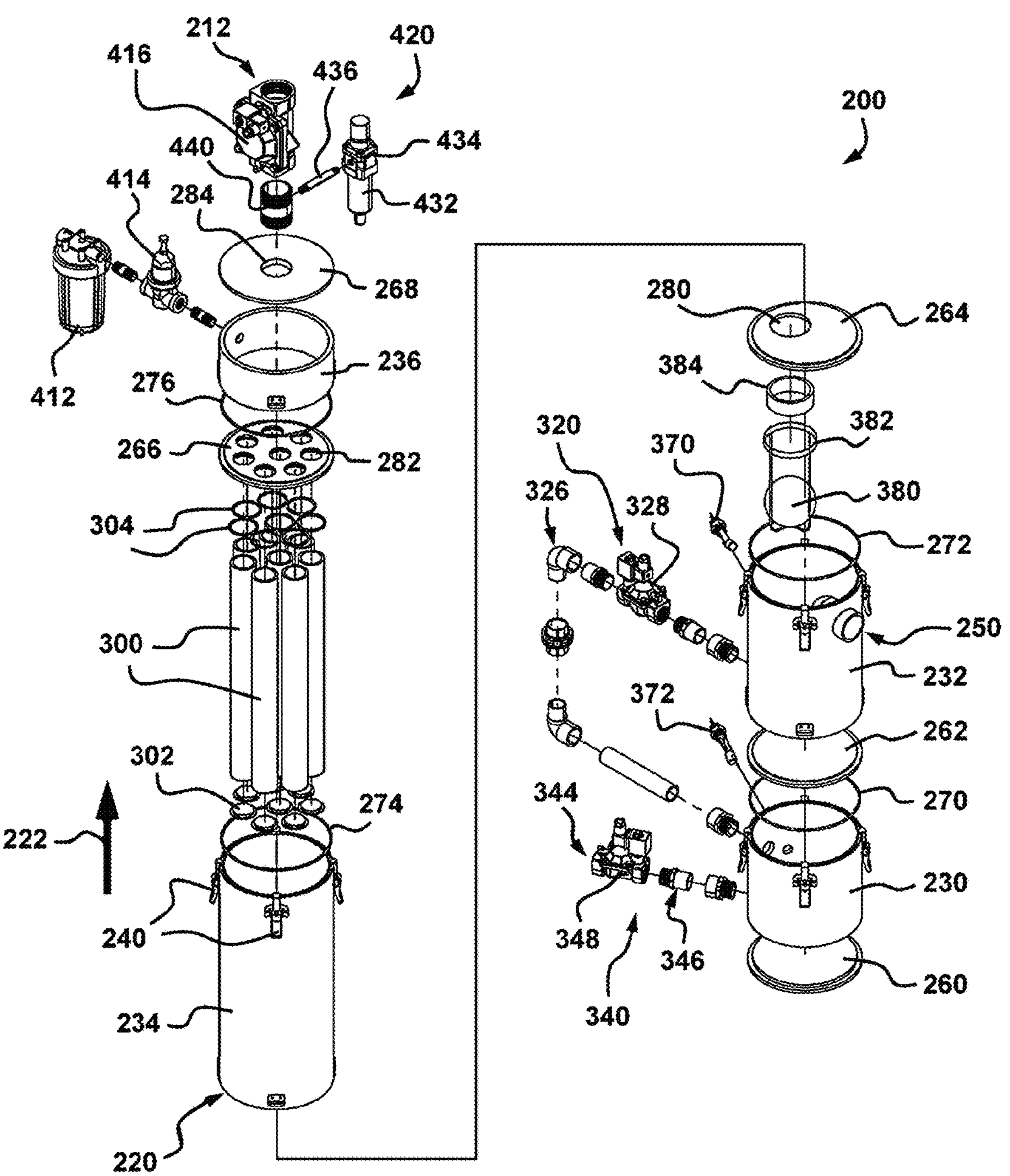
FIG. 4 is an exploded view of the system in FIG. 1.

FIG. 4 is an exploded view of the system 200, where the sections of the system 200 are shown separated from another for the sake of illustration.

In this embodiment, the bottom end of the sump and flow stream input sections 230 and 232 of the vessel 220 is closed by respective plates 260 and 262. The outer periphery of the underside of the plate 262 and the top edge of the sump section 230 are configured to engage and cooperate with one another, a gasket 270 sealing the junction in an airtight manner therebetween. Likewise, the bottom end of the filter section 234 and the output section 236 is closed by respective plates 264 and 266, and the top end of the output section of the vessel 220 is closed by a plate 268; the outer periphery of the underside of plate 264 and the top edge of flow stream input section 232 are configured to engage and cooperate with one another, a gasket 272 sealing the junction in an airtight manner therebetween; the outer periphery of the underside of plate 266 and the top edge of section 234 are configured to engage and cooperate with one another, a gasket 274* sealing the junction in an airtight manner therebetween.

The plates may be permanently attached to their respective section, for instance by welding or gluing, or removably attached, and the junctions are sealed in an airtight manner, using gaskets for example, as described hereinabove such as annular seals, such as O-rings, made of a resilient material. Clamps 240 as described hereinabove may be selected and positioned to maintain the gaskets in a compressed state when the system 200 is fully assembled. Other connections between the sections are possible. Connections may be permanent or removable. Alternatively, one or more of the plates may be connected in an irremovable manner to the top end of an adjacent section.

As shown FIG. 4, the bottom plates 260, 262 of the sump and input flow stream sections 230, 232 have a continuous solid surface, while the bottom plate 264 of the filter section 234 comprises an aperture 280 offset with reference to the center of the plate 264, and the bottom plate 266 of the output section 236 comprises a first aperture 282' approximately at the center thereof and second apertures 282 radially distributed about the center, while the top plate 268 of the output section 236 closing the top end of the vessel 220 comprises an aperture 284 at the center of plate 268. These apertures may have a circular cross-section, as illustrated. Other configurations are possible. For example, the number, position, size, and/or section of one or more of the apertures may differ. The apertures lead air passing across the system 200.

Figure 6:
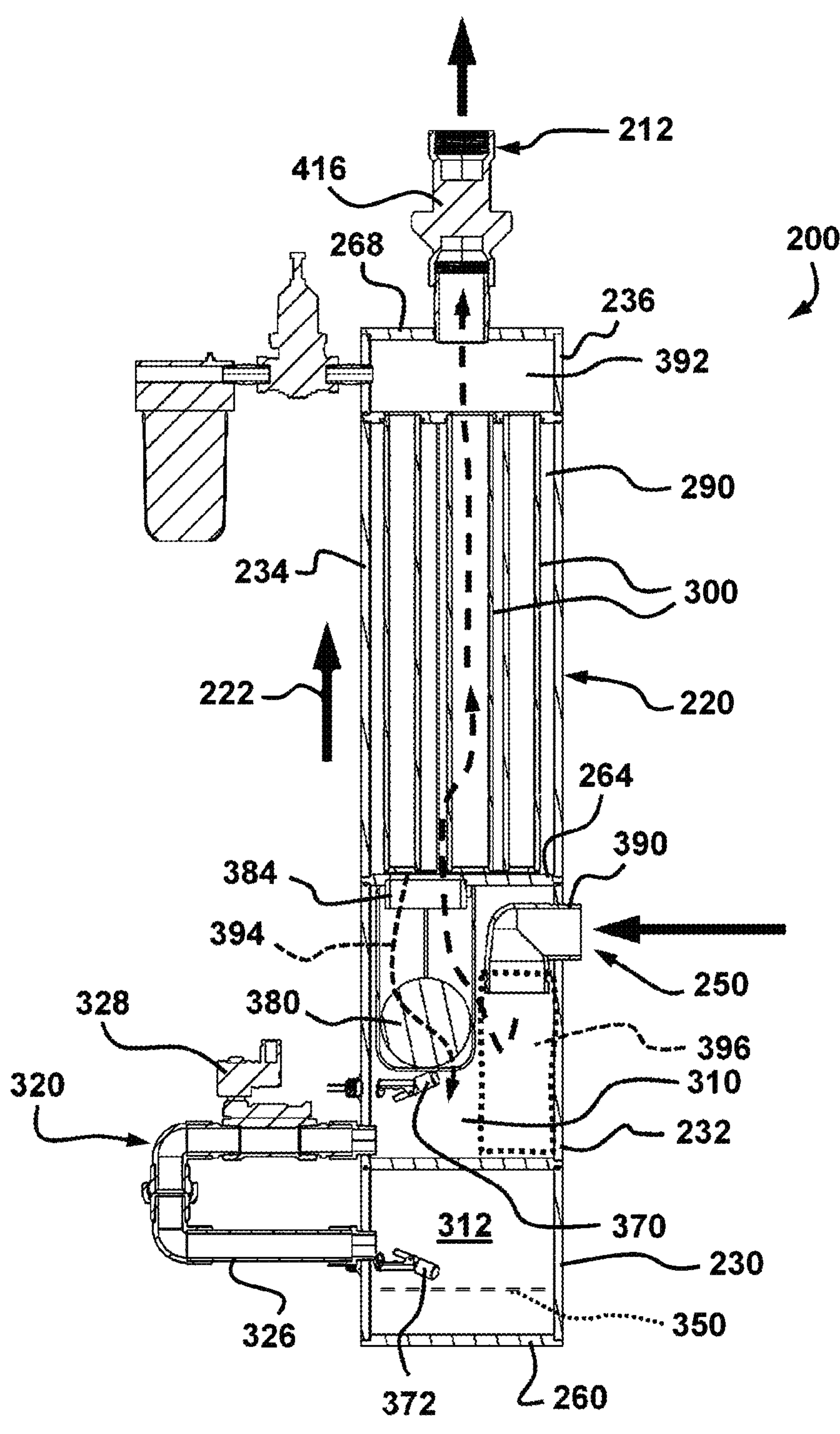
FIG. 6 is a longitudinal cross sump drainage assembly section view of the system in FIG. 1 along line 6-6 in FIG. 5.

As best seen in FIG. 4, the filter section 234 comprises a plurality of spaced apart filter elements 300 (see FIG. 6 for example). The filter elements 300 and the radial apertures 282 of the bottom plate 266 of the output section 236 sealing the top end of the filter section 234 are in matching numbers, for example eight in the illustrated example, the number and the size of filter elements 300 being selected to optimize an available flow stream treatment volume within the filter section 234 for optimizing the contact surface between the flow stream and the filter elements, while leaving space between the filter elements 300 to allow flow stream circulation between the outer surfaces of the filter elements 300 as well as liquid accumulation on the outer walls of the filter elements (as will be discussed hereinbelow) to flow down the outer walls of the filter elements between the filter elements 300 to the aperture 280 of the bottom plate 264 of the filter section once it reaches the bottom of the filter section as will be described hereinbelow The filter elements 300 as illustrated herein are tubes of a generally annular cross section, extending substantially parallel to the longitudinal axis 222 of the vessel 220; and positioned substantially parallel to one another, the top end of each filter element 300 being in registry with a corresponding one of the first apertures 282 in the plate 266 and the bottom end abutting the top plate 264 of flow stream input section 232 located below the filter section 234. Other configurations are possible. For example, the number, shape, and/or layout of the filter elements may be different in other implementations.

In operation, the flow stream is made to flow through the filter section, the bottom end of each filter element 300 being closed by a cap or plug 302, thereby forcing the flow stream to exit at the top end thereof to the outlet 21 of the system (FIG. 4) as shown in the embodiment shown in FIGS. 1-10. A gasket 304, for instance an O-ring made of a resilient material, is provided between the top end of each filter element 300 and a peripheral surface around the corresponding aperture 282 on the underside of the plate 266. Once the illustrated system 200 is fully assembled, the bottom caps 302 engage the top surface of the top plate 264 of flow stream input section 232 located below the section 234 of the filter section and the gaskets 304 at the top ends of the filter elements 300 in a compressed state provide an airtight seal and secure the filter elements 300 in place within the filter section in flow stream input section 232. The bottom surface around each aperture 282 of flow stream input section 232 top plate 266 may comprise an annular peripheral shoulder receiving the top end of a corresponding filter element 300 in a tight fit or constricted manner. Other configurations are possible. For example, other types of filter elements may be used. Securing of the filter elements may also be different in some implementations.

The size and geometry of the filter elements 300 are selected in such a way that the average velocity of the flow stream passing through the filter section is considerably decreased compared to the average velocity of the flow stream at the inlet port 250 of input of the flow stream within the system (see FIG. 6 for example), allowing vapor or liquid in the flow stream to agglomerate and form droplets on the outer walls of the filter elements, then coalescence to droplets large enough to be drained down along the length of the outer walls of the filter elements, by gravity.

For instance, in case of an inlet port 250 of a diameter of about 2 inches (50.8 mm), selecting tubes of an outer diameter of about 50 mm, an interior diameter of about 40 mm and a length of about 500 mm, yields an overall outer surface area of the filter elements 300 about 274 times larger than the surface area of entry of the flow stream at the inlet port 250 of the system. The velocity of the air flowing up through the filter section is thus considerably decreased, promoting the coalescence of the vapor/liquid on the outer surfaces of the filter elements 300. The material, the shape, the length, and the diameter of the filter elements 300 are selected, as well as the porosity and size of pores thereof, of the filter elements 300, according to the application, depending on the nature of the flow stream to be treated and its composition and contaminants, which determines ranges of size of particles to be captured from the flow stream. The filter elements 300 are made in a material selected for allowing coalescence of vapor and/or liquid present in the flow stream, such as frittered plastics, or sintered ceramics and sintered metallic powders, or a combination thereof for example.

By thus circulating the flow stream up through the filter section, liquid and dirt particles and other impurities are efficiently removed from the flow stream, and a resulting purified flow stream exits the filter section through the apertures 282 of the top plate 266 of the flow stream input section 232 to the output section 236, leading to the air outlet 212 of the system 200 (see FIG. 6), connected to the air inlet of the vacuum pump 210 for example. Other configurations are possible.

Liquid dripping down the outer surfaces of the filter elements 300 eventually reach the top surface of the plate 264 at the bottom of the section 234 and are drained from the filter section through the aperture 280 in the bottom plate 264 of the filter section 234, to the flow stream input section 232 located immediately below. Liquid falls from the periphery of the aperture 280 the bottom plate 264 of the filter section 234 towards the bottom of the flow stream input section 232. The flow stream input section 232 is also where the inlet port 250 for the input flow stream is located, positioned on the sidewall of the flow stream input section 232 above the bottom of the input flow stream, at a height from the top surface of the bottom plate 262 of the flow stream input section 232 in the illustrated embodiment (see FIG. 6 for example). The inlet port 250 is close to the top plate 264 of the flow stream input section 232 in this embodiment. The flow stream input section 232 is in fluid communication with a sump 312 in the sump section 230, configured to receive the liquid received from the flow stream input section 232.

Figure 7:
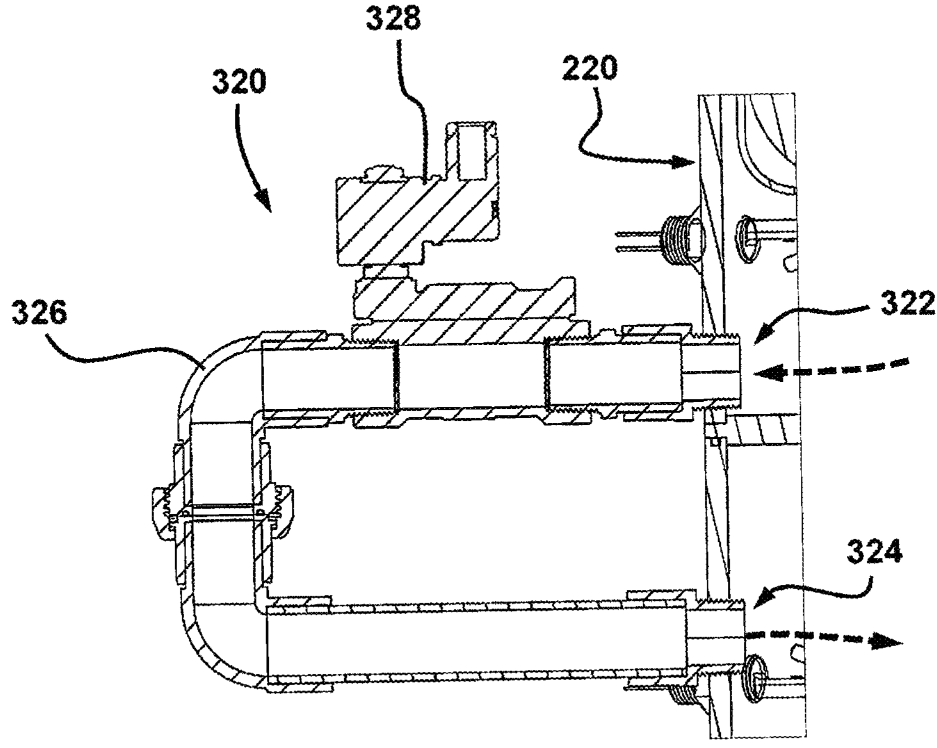
FIG. 7 is an enlarged view of a water transfer assembly shown in FIG. 6.

The sump 312 in the sump section 230 of the illustrated system 200 receives the liquid drained from the filter section 234 though the flow stream input section 232, through a tubing 320 establishing a selective fluid communication between an outlet drain port 322 of the flow stream input section 232 of the vessel 220 and an inlet port 324 of the sump 312 in the sump section 230 (see FIGS. 6, 7). The tubing 320 as illustrated in FIGS. 2, 3, 4, 6 and 7 for example, comprises a U-shaped conduit 326 with a shutoff valve 328 connecting the outlet drain port 322 of the flow stream input section 232 and the inlet port 324 of the sump 312 from the outside of the vessel 220. The U-shaped conduit 326 may comprise different subparts, such as elbows, straight conduits, fittings, etc. Other configurations are possible. For example, the tubing 320 may be positioned inside or partially inside the vessel 220. Liquid thus collected in the sump section may then be drained out of the system as will be described hereinbelow.

In absence of a sump, the liquid drained from the filter section 234, and received from the flow stream input section 232, may still be drained out of the flow stream input section 232 using a tubing with a valve selectively operated to drain the system without impact on the vacuum conditions inside the system 200. Other variants are possible as well.

Figure 8:
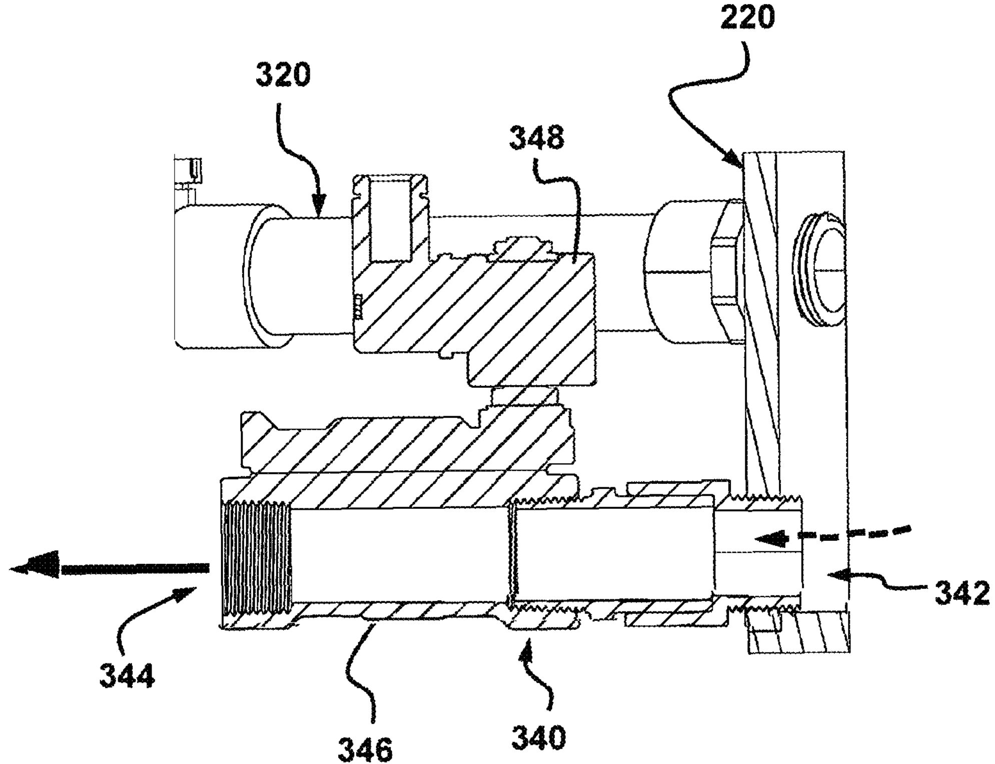
FIG. 8 is an enlarged view of a sump outlet shown in FIG. 6.

According to an embodiment of an aspect of the present disclosure as shown in FIG. 8, a sump outlet drain 340 is used for selective fluid communication between an outlet port 342 of the sump 312 and the exterior of the system 200 thus operating as the water outlet 344 of the system 200. The sump outlet drain 340 in the example comprises a drain conduit 346 with a shutoff valve 348. Other configurations are possible. For example, at least one or more of the parts may be designed differently and/or be omitted in some implementations. The sump outlet 340 may be positioned inside or partially inside the vessel 220 in some implementations. Other variants are possible as well.

Figure 5:
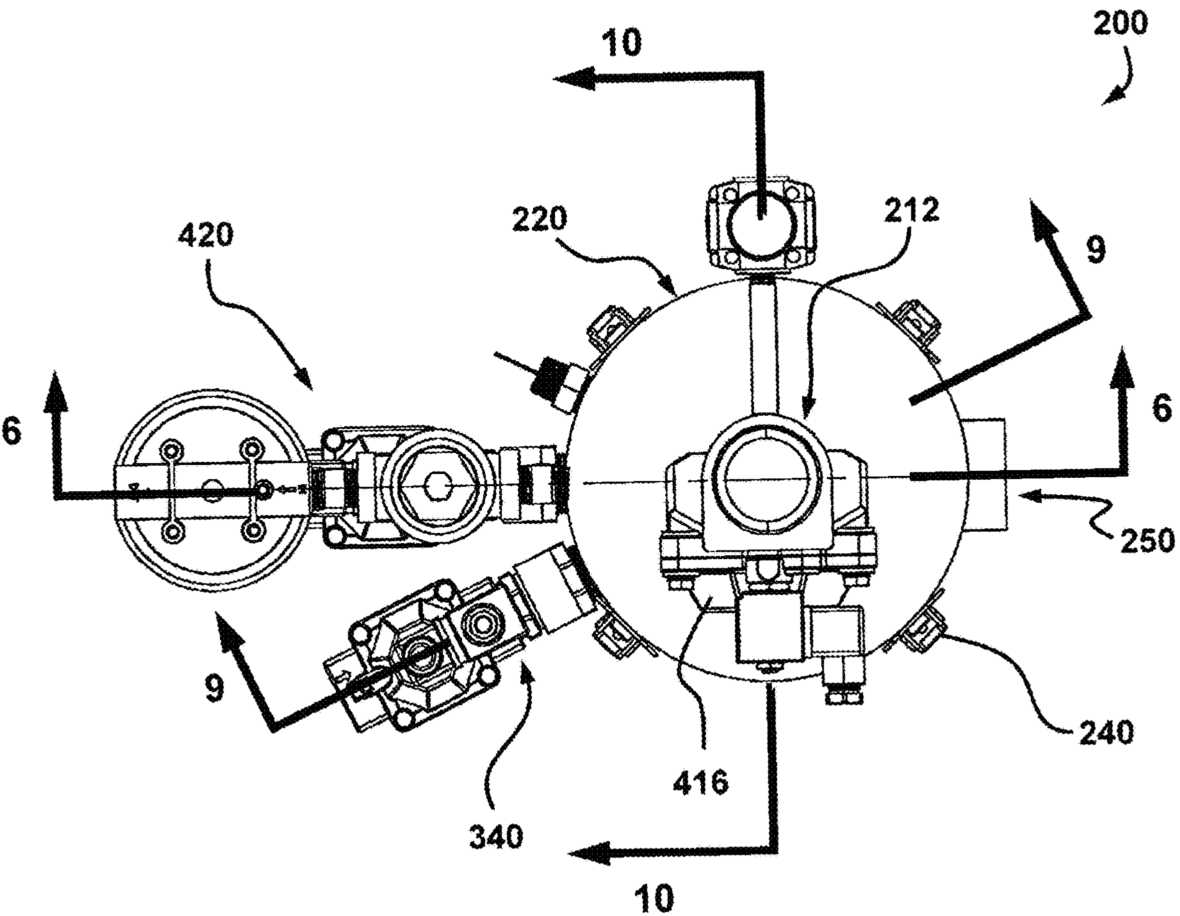
FIG. 5 is a top view of the system in FIG. 1.

FIG. 5 is a top plan view of the system 200 in FIG. 2. It shows, for example, where the cross-section views in subsequent figures are taken, for example, in FIG. 6. FIG. 6 is a longitudinal cross section view of the system 200 in FIG. 2 taken along line 6-6 in FIG. 5. FIG. 7 is an enlarged view of the tubing 320 shown in FIG. 6. This view corresponds to what is illustrated at the bottom left side in FIG. 6. FIG. 8 is an enlarged view of the sump outlet 340 shown in FIG. 6.

In operation, the valve 328 of the tubing 320 between the flow stream input section 232 and the sump 230 is normally open and the valve 348 of the sump outlet 340 is normally closed, and the water collected from the filter section transferred continuously by gravity into the input flow stream section 230, as schematically depicted in FIG. 7, accumulates in the sump 230 of the vessel 220. The liquid level is schematically represented in FIG. 6 at 350. Other configurations are possible.

The drainage operation of the sump 312 is performed at intervals. In the illustrated embodiment, for draining the sump 312, the valve 328 of the tubing 320 connecting the input flow stream section and the sump is closed and the valve 348 of the sump outlet 340 is opened. Some air may initially enter inside the sump 312 until the pressure reaches the ambient air pressure and the collected water may start flowing, as schematically depicted by arrows in FIG. 8, and be drained out of the system 200 through the outlet port 342 of the water outlet 344 of the sump. Such wastewater may be selectively directed through a pipe or line into a pan, a container or any other type of receptacle, and then treated or directed to be treated if contaminated so as to preserve the environment, and uncontaminated wastewater may be simply discarded.

During the sump drainage operation, water collected from the flow stream in the filter section accumulates at the bottom of the flow stream input section 232 since the valve 328 of the tubing 320 between the flow stream input section 232 and the sump is closed. Once the sump drainage operation is over, the valve 348 of the sump outlet 340 is closed and the valve 328 of the tubing 320 between the flow stream input section 232 and the sump may be opened again to resume drainage of liquid from flow stream input section 232 down to the sump. Some air may be initially drawn to equalize the pressure between the sump 312 and the flow stream input section 232. Once the pressure is equalized, the collected water flows once again down into the sump 312. Other configurations are possible.

Opening of the valves may be done progressively to prevent a sudden pressure change inside the connected sections.

The valves may be controlled remotely by an operator, by computer, or both. As schematically shown in FIG. 2, the valves 328, 348 are connected to a control module 360 through a respective wired and/or a wireless communication link 362 for remote control. The actuator of each valve may receive electrical power through a wired segment of the link 362, or through another source. The control module 360 may be a computer, a dedicated circuit, or the like, accessed by an operator directly at the control module 360 itself or through a control panel or interface 364 via a communication network 366 for example. The control panel or interface 364 may comprise, for instance, a portable apparatus or smart phone communicating with the control module 360 through the Internet, a private network, etc. For example, one or more of the valves 328, 348 may be controlled remotely using another method, for instance pneumatic or hydraulic methods. Manually actuated valves 328, 348, which cannot be controlled remotely and require an operator to be physically present to conduct a drainage operation or to empty the sump, may also be used. Other configurations are possible. Other variants are possible as well.

The water transfer and sump drainage operations may be based at least in part on information or signals received from one or more sensors indicative of the liquid level inside each section 230, 232. As shown for instance in FIG. 4, a sensor 370 may be selectively positioned to monitor the liquid level inside the flow stream input section 232, and a sensor 372 selectively positioned to monitor the liquid level in the sump 312, where each one of the sensors 370, 372 have one end inserted secured in an airtight manner through a corresponding port provided on the lateral wall of the vessel 220. Each sensor may be connected to the control module 360 through a wired and/or wireless unit for example (not shown). The sensors 370, 372 are selected and positioned to generate signals indicative of the liquid level inside the flow stream input section and the sump 312 respectively, and in particular if the liquid level has reached or is approaching a predetermined threshold. They may be selected to determine the actual level or, in some implementations, one or more of these sensors may simply be selected to indicate whether the liquid level in a given section chamber has reached a predetermined threshold. The information or signals provided by one or more of the sensors 370, 372 may trigger selective opening and closing of the different valves for liquid transfer and/or sump drainage operations. Other configurations are possible. For example, other types of sensors may be used, such as mechanical sensors using a float to measure the liquid level, the information being displayed on a dial or the like, or sight gauges or the like. Different types of sensors may be used within a same system, and more than one sensor may be used at one or more locations for redundancy. Still, it is possible to omit one or even all sensors from a system in some implementations. Other variants are possible as well.

The sump drainage operation may also be based, at least in part, on time. For instance, the control module 360 may be programmed to conduct various sequential steps after at predetermined time intervals, and only rely on the sensors 370, 372 to prevent event such as overflow. The sensors 370, 372 may be connected to an alarm system, either directly or through the control module 360. One or both sensors may trigger an alarm signal for the operator and/or an alarm sign that may be used to prompt shut down of the vacuum pump connected to the system if needed. These sensors 370, 372 are thus security features. Other configurations are possible.

As also illustrated in FIG. 4, the system 200 according to an embodiment of an aspect of the present disclosure comprises a float 380 suspended under the aperture 280 through the plate 264 at the bottom of the uppermost section 234 by a float holder 382 restricting the float 380 to an up-and-down motion. The float 380 may be a buoyant ball-shaped element as shown, loosely fitted inside the float holder 382, and resting at the bottom thereof when there is no collected water inside the flow stream input section 232. The top of the float holder 382 may be attached to the plate 264 through a tubular fitting 384 of a diameter smaller than a diameter of the float 380 so that if the liquid level reaches a predetermined threshold as monitored using sensors as described hereinabove for example, for instance during a sudden flooding event or if the water transfer operation is not completed, the float 380 engages and seals the outer periphery at the bottom end of the fitting 384 thereby obstructing the air circuit completely. The vacuum pump 210 may still run normally even if the air circuit is interrupted. The float is thus a safety feature to protect the vacuum pump 210. Other configurations are possible. For example, the float may be configured, shaped and/or positioned differently. The float may be omitted in some implementations. Other variants are possible as well.

The air circuit of the flow stream inside the system 200 is schematically shown by arrows in FIG. 6. The flow stream enters the system 200 through the inlet port 250 provided on a lateral wall of the flow stream input section 232. In the illustrated embodiment, an elbow 390 is provided at the inlet port 250. One end of the elbow 390 extends out of the vessel 220, and the remaining body of the elbow 390 is located inside the flow stream input section 232 and redirects the incoming flow stream towards the bottom of the flow stream input section 232, in such a way that some of the liquid water carried by the incoming flow stream falls directly at the bottom of the reservoir in the bottom of the flow stream input section 232. The air circuit then goes from the bottom end of the elbow 390 to the filter section 234 immediately above. It passes in the vicinity of the float 380 and through the fitting 384 that is attached under the plate 264. The air circuit then flows up between the filter elements 300, to the chamber 392 located inside the topmost section 236 before leaving the system 200 through the air outlet 212 located at the top. The broken lines going upwards in FIG. 6 depict only a small portion of the air circuit. Air flows along the outer surface of all the filter elements 300, at a velocity adjusted to allow vapor and liquid droplets to coalesce on the walls of the filtering members. Sintered filters for example, commercially available in a wide variety of shapes and sizes, allow most of the water to separate from the air within the flow stream, thereby resulting in a purified and dryer air in the air circuit coming out of the air outlet 212 of the system. The liquid thus captured by the filter elements 300 flows towards the bottom by and exits the filter section through the aperture 280 at the bottom end of the filter section (FIG. 4). The flow path of the dripping water is schematically represented in FIG. 6 at 394, collected at the bottom of flow stream input section 232.

According to an embodiment of an aspect of the present disclosure as illustrated in FIG. 6, the system 200 may comprise a prefilter 396 inside the flow stream input section 232, positioned right after the bottom end of the elbow 390 of the inlet port 250 of the vessel 220. The prefilter 396 may be connected around the outer periphery of the end portion of the elbow 390, for instance. The prefilter 396 may be a bag made of paper or a fabric selected for resisting immersion in water for instance, and for removing dirt or other impurities before they may reach the filter elements 300, thereby extending the time intervals between the cleaning operations of the filter elements 300 for instance. A prefilter or an additional prefilter may also be positioned upstream of the inlet port 250 of the vessel 220. Other configurations are possible.

Figure 9:
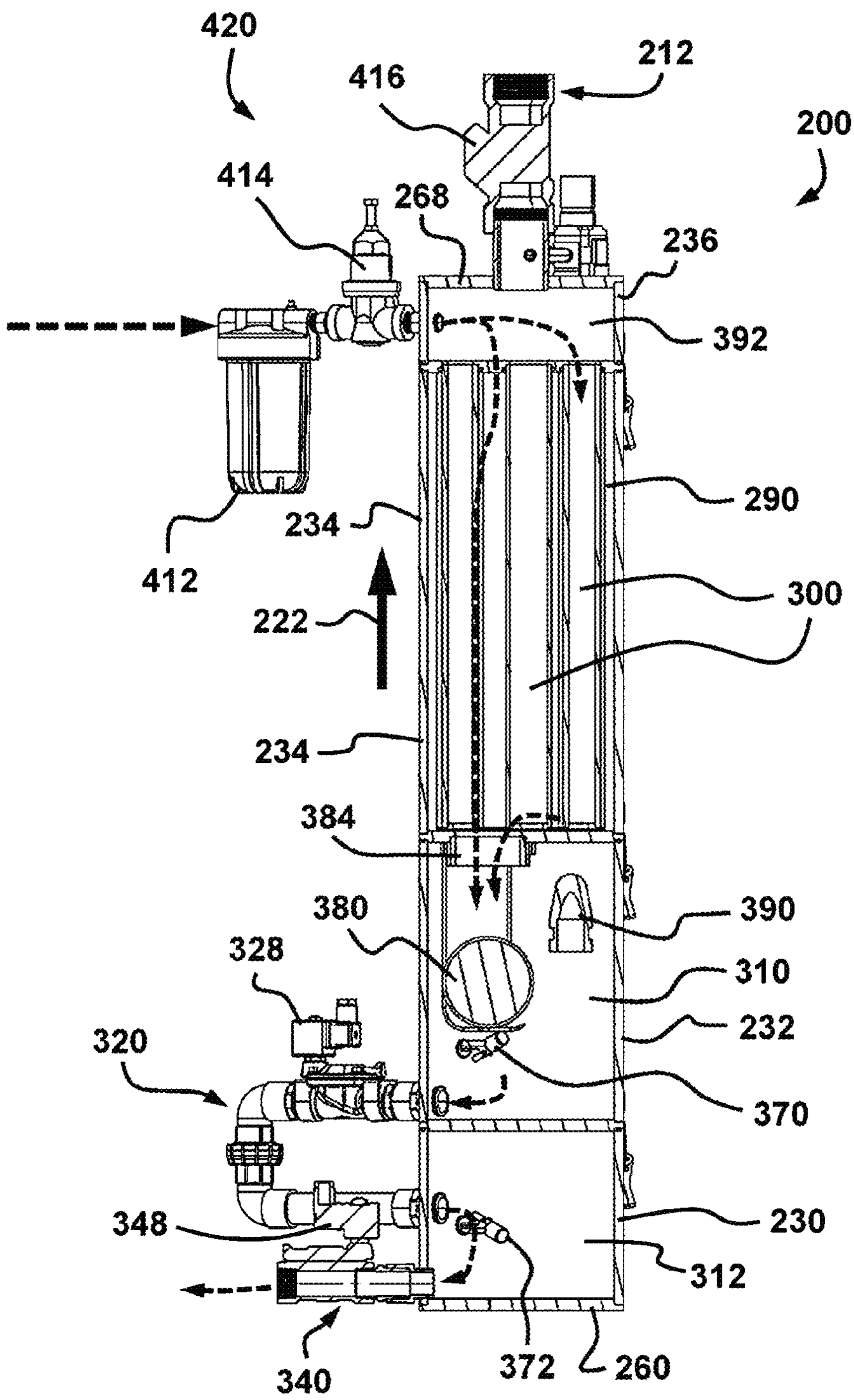
FIG. 9 is a longitudinal cross section view of the system in FIG. 2 along the line 9-9 in FIG. 5.

In an embodiment of an aspect of the present disclosure as shown in the longitudinal cross section view of the system 200 in FIG. 2 taken along line 9-9 in FIG. 5, of FIG. 9, the system 200 may comprise a built-in cleaning unit 420. Such a cleaning unit may also be omitted in some implementations. For cleaning operation, the system 200 is inactivated for a given amount of time; in case continuous operation is needed, it may be contemplated having two or more systems 200 in parallel, in such a way that a system may be inactivated for cleaning operation while operation proceeds.

The filter elements 300 may also be removed from the interior of the system 200 for cleaning operation, notwithstanding the presence of the cleaning unit 420 in this embodiment, or replacement.

In the illustrated example, the cleaning operation comprises using a pressurized stream of liquid water circulating through the filter elements 300 in a countercurrent direction, namely in a direction opposite to that of the air circuit when the system 200 is in operation. This water may be hot or warm, or at room temperature or colder in some implementations. Water may be used in combination with another substance. Filter elements 300, for instance sintered filters, do not generally allow liquid water to flow easily across the material without using a relatively high pressure. A pressurized cleaning water supply 410 is schematically shown in FIG. 2. The water coming from the pressurized cleaning water supply 410 then goes through a water filter 412, and the flow is controlled/regulated using a regulator 414. The cleaning water enters the output section 236 through a corresponding port provided through the lateral wall. A shutoff valve 416 located immediately upstream of the air outlet 212 of the system 200 is closed during the cleaning operation to prevent the cleaning water from flowing out of the system 200 through the air outlet 212, and possibly reaching the inlet of the vacuum pump 210. Thus, the only possible path for the cleaning water is through the filter elements 300. The cleaning water through the interior of the tubes, for efficient dislodging of dirt or impurities from the filter elements. The cleaning water that passed through the filter elements 300 falls to the bottom of the filter section, then into the reservoir at the bottom of the flow stream input section 232. The shutoff valve 328 of the tubing 320 and the shutoff valve 348 of the sump outlet 340 are open for evacuation of the cleaning water throughout the cleaning operation.

The cleaning unit 420 on the illustrated example further comprises a subassembly allowing a stream of pressurized air to flow between the filter elements 300 in a countercurrent direction compared to the direction of the flow stream entering the system by port 250. Air coming from a pressurized drying air supply 430 goes through a drying air filter 432, and the flow is controlled/regulated using a valve 434 before passing through a straight conduit 436 (FIG. 2).

Figure 10:
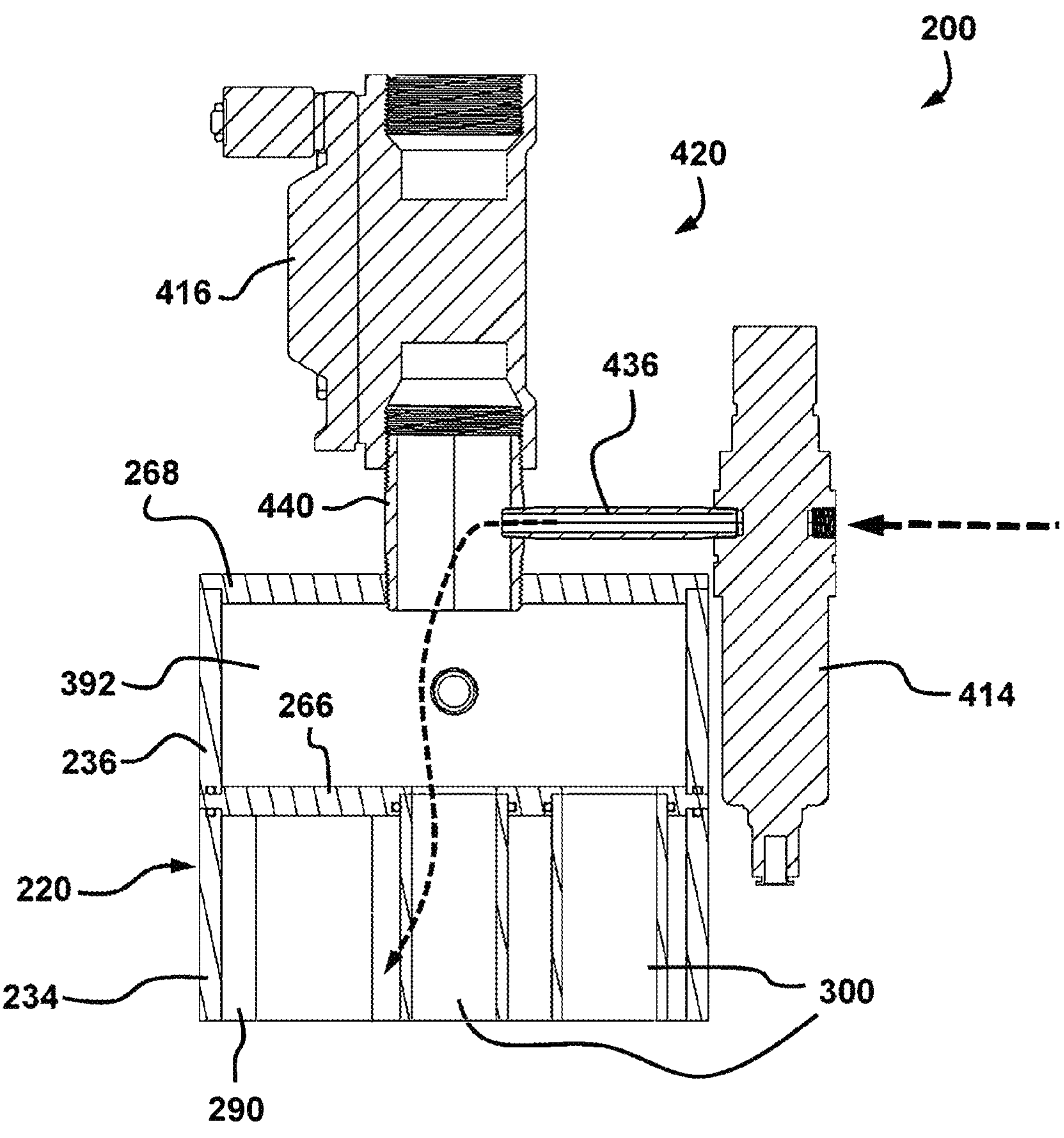
FIG. 10 is an enlarged longitudinal cross section view of the top of the system in FIG. 2 along the line 10-10 in FIG. 5.
Figure 11:
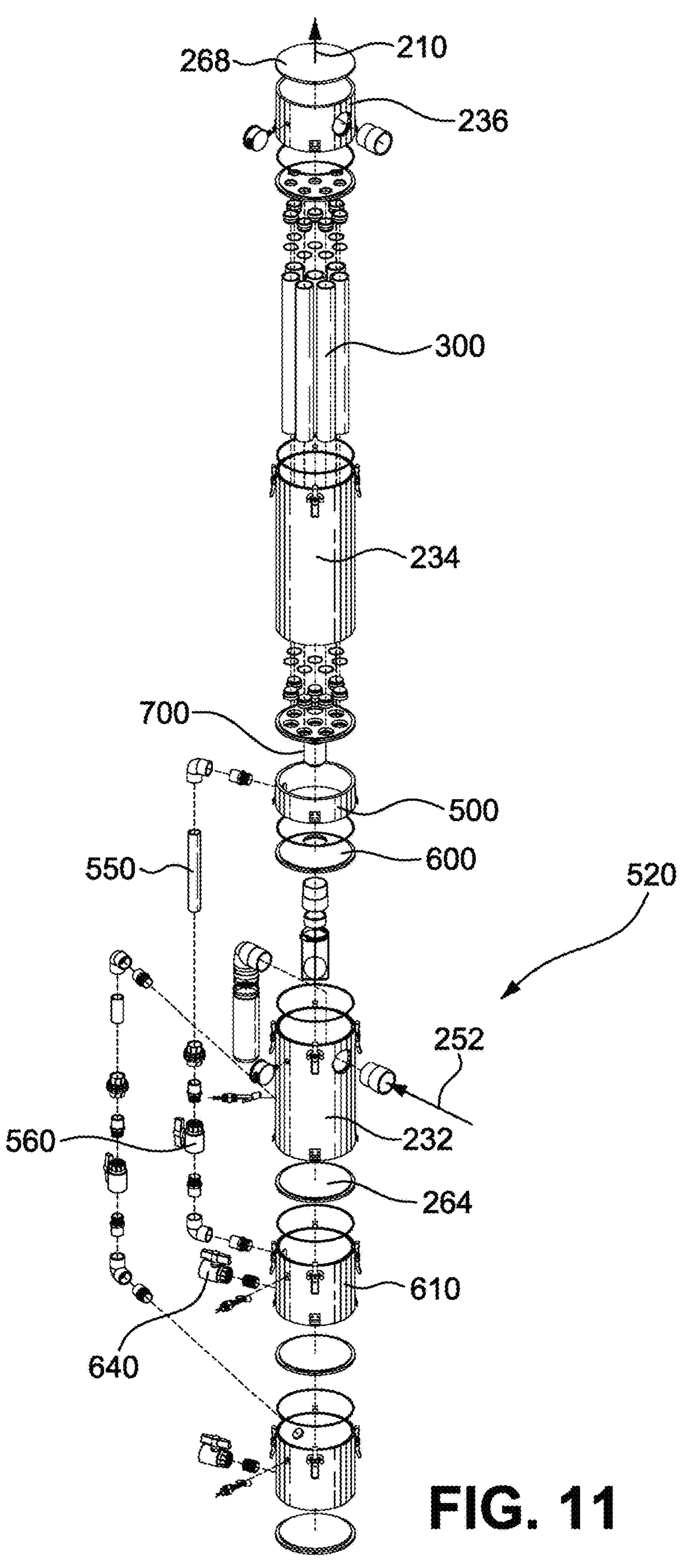
FIG. 11 is an exploded view of a system according to an embodiment of the present disclosure.
Figures 12A, 12B:
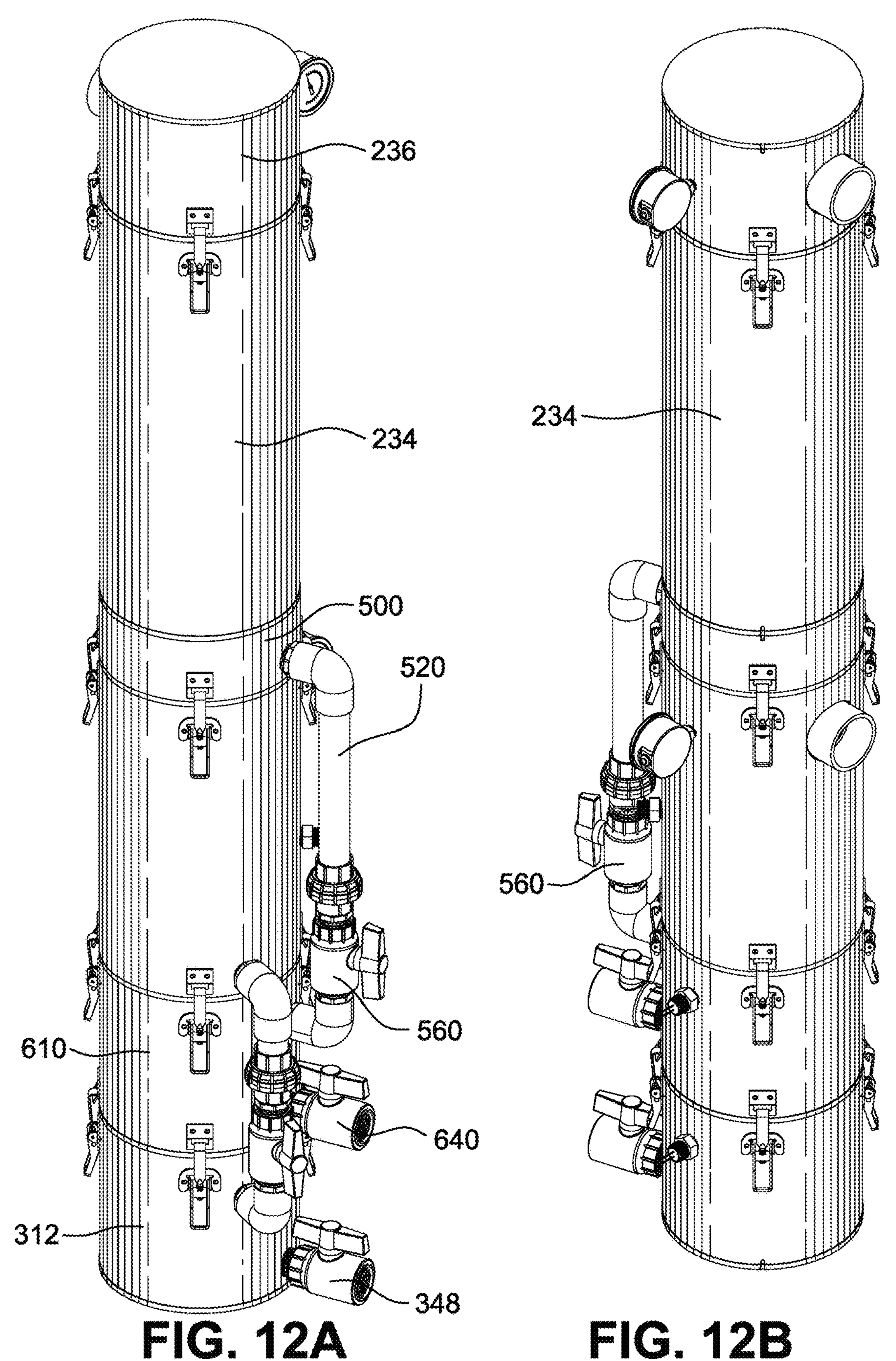
FIG. 12A is a first schematical view of the system of FIG. 11.
FIG. 12B is a second schematical view of the system of FIG. 11.
Figure 13:
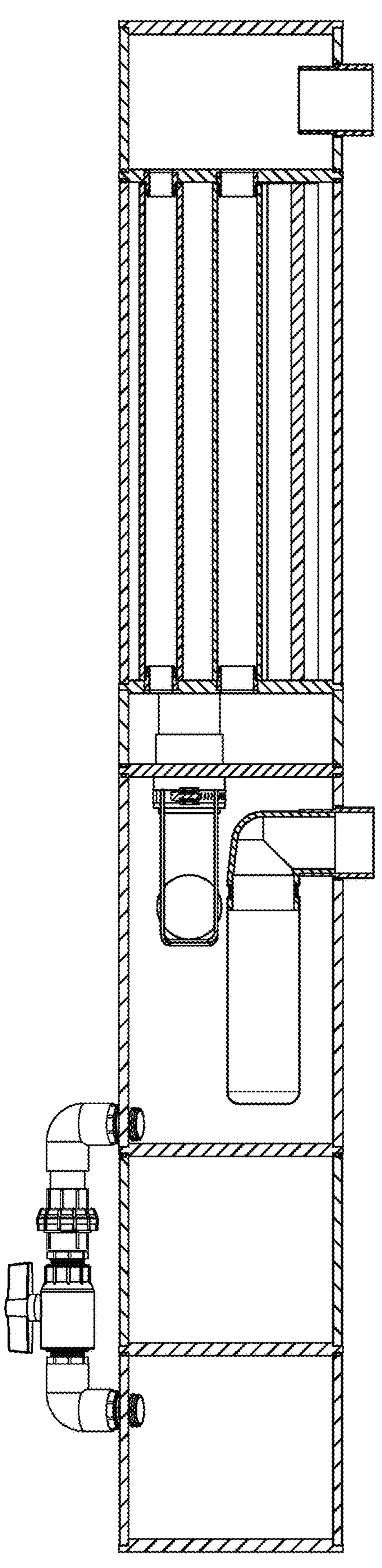
FIG. 13 is a first longitudinal sectional view of the system of FIGS. 11-12.
Figure 14:
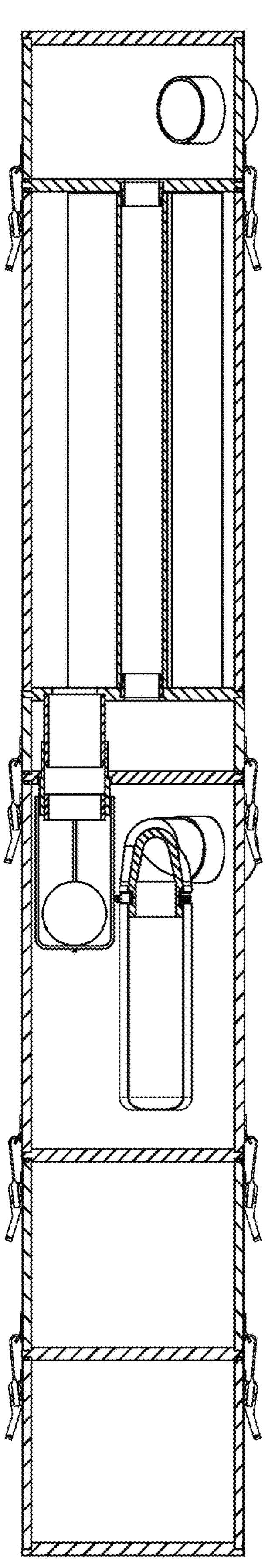
FIG. 14 is a second longitudinal sectional view of the system of FIGS. 11-12.

FIG. 10 is an enlarged longitudinal cross section view of the top of the system 200 in FIG. 2 taken along line 10-10 in FIG. 5, showing the pressurized drying air entering the system 200 during the drying phase of the cleaning operation. As may be seen, a straight conduit 436 leads to a port made on a top fitting 440. The shutoff valve 416 located immediately upstream of the air outlet 212 of the system 200 being still closed, the pressurized air is forced to go through the filter elements 300. It may escape through the inlet port 250 and/or following the same path as the cleaning water. FIG. 9 is an enlarged view of the sump outlet 340.

In an embodiment according to an aspect of the present disclosure as illustrated in FIGS. 11-14, the system further comprises an inner tube draining section 500. The inner tube draining section 500 is completely sealed between the filter section 234 and the flow stream input section 232, by the lower end of the tubes 300 resting on the bottom plate 264 of filter section 234 and a bottom separator plate 600 of the inner tube draining section 500. The inner tube draining section 500 is connected to a reservoir 610 though a tubing 550 for collecting of liquid drained from the inside of the tubes 300 of the filter section. The tubing 550 comprises a conduit with a valve, such as a float valve with a horizontal float switch 560 as illustrated for example, between an outlet drain port of the inner tube draining section 500 and an inlet port of the reservoir 610, the reservoir 610 comprising a reservoir valve 640 controlling the outlet port of the reservoir 610.

The inner tube draining section 500 receives liquid accumulated inside the tubes 300; the collected liquid is directed by the tubing 550 to the reservoir 610 when the valve 560 in the tubing 550 between the inner tube draining section 500 and the reservoir 610 is open, in a circuit completely independent of the recovery circuit of liquid from outside the tubes described hereinabove.

With the valve 560 on the tubing 550 between the inner tube draining section 500 and the reservoir 610 and the shutoff valve 328 of the conduit 326 of tubing 320 between the filter section 234 and the sump 312 in the sump section are closed to drain the reservoir 610 and the sump 312 as the shutoff valve 348 of the sump 312 and valve 640 controlling the outlet port of the reservoir 610 are open, the system still operates and delivers filtered flow stream at its output under vacuum. Once the reservoir 610 and the sump 312 are drained, the shutoff valve 348 of the sump 312 and the reservoir valve 640 controlling the output port of the reservoir 610 may be open to resume drainage of the liquid accumulated in the input flow stream section from the outside of the filtering tubes in the filter section and in the inner tube draining section 500 from the inside of the filtering tubes in the filter section.

Thus, vapor or liquid in the input flow stream, coalesced on the inner walls of the tubes, is drained from inside the tubes, while cleaning the inside walls of the tubes from matter than may accumulate thereon in the process, such as sugars in the case of a sugar bush, by the liquid trickling down along the inner walls of the tubes.

The present system may operate continuously for an extensive period of time, protecting the inlet of the vacuum pump even if the pump is not operating and in the absence of a negative pressure. The system 200 may be particularly useful for vacuum pumps provided in sap harvesting facilities, for instance maple sugaring facilities, but it may also be particularly useful in other applications, such as in dairy farms, to prevent water from accumulating excessively in the lubricating oil reservoir of the vacuum pumps. The system 200 may thus be used primarily as a dehydrator, protecting the vacuum pump by minimizing, or even preventing, water accumulation in lubricating oil reservoirs. Other situations are possible as well.

Also, while the present system is primarily intended for use at the inlet of a vacuum pump, it may be modified to receive a flow stream of compressed air, or air at a pressure significantly higher than the atmospheric pressure. The system may be positioned upstream of the inlet of an apparatus or equipment, for instance a tool or another type of device using pressurized air, and prevent liquid water from entering through the inlet of this apparatus or equipment, and/or minimize or prevent water accumulation in the lubricating circuit of this apparatus or equipment. The vessel 220, and in particular the interconnections between various sections thereof, may be adapted to resist positive pressure conditions. For example, the vessel 220 may be constructed as a monolithic unit, or the sections may be welded together. Other configurations are possible as well.

There is thus presented a filter system for protecting a vacuum pump. The system is configured, for example, to separate and remove water from the air within the air circuit going to a vacuum pump, and also to prevent water from entering the inlet of the vacuum pump during a flooding event or the like.

This filter system is simple yet highly effective. The water or vapor separated from the air falls in a filter chamber, and because it is generally not desirable to stop the vacuum pump and open the interior of the system to the atmosphere every time the collected liquid needs to be drained, the liquid collected in the filter chamber is received into a second chamber, for accumulation, and/or drainage out of the system at intervals while maintaining the negative pressure conditions in the system thereby allowing continuous operation of the system. The system may thus run continuously, even during drainage operations thereof. The system continuously protects the vacuum pump from a flooding event or the like even when the vacuum pump is not operating.

There is thus presented a system for processing input flow stream into filtered flow stream, by removing liquid from the input flow stream and delivering the filtered flow stream to the inlet of an equipment such as a vacuum pump, with a minimized flow stream restriction. The system may be configured to capture coarse particles, contaminants, as well as liquid and/or vapors, under vacuum conditions, store waste liquid containing the collected liquid and/or vapors and particules, and safely drain the waste liquid while maintaining vacuum conditions.

The system achieves a reliable operation in multiple stages, capturing undesirable matter carried by the input flow stream under vacuum conditions and reducing or even eliminating liquid accumulation.

The system comprises a filter chamber configured to control the speed of the flow stream entering the filter chamber without reducing the volume and the intensity of the vacuum. The filter chamber comprises filter elements having a selected porosity and a selected smooth and non-permeable surface; the geometry, the size and the distribution of filter elements are selected in relation to the system's input flow stream inlet to control the flow stream passing through filter elements in such a way to allow vapors to deposit on surfaces of the filtering elements where they form into droplets, and allow the formed droplets to dripple along the surfaces of the filtering elements down the bottom of the filter chamber and be then drained into a liquid receiving chamber.

When sliding down along the surfaces of the filtering elements, the droplets also have a cleaning effect by dislodging impurities that may have deposited, thereby preventing clogging of the filtering elements.

The liquid captured in the filter chamber is directed by a tubing provided with a valve to the liquid receiving chamber, the valve being closed to selectively stop the vacuum in the liquid receiving chamber for drainage thereof with an outlet valve of the liquid receiving chamber open to the outside of the system, without reducing the vacuum in the system.

The system may be automatically controlled using an electronic module and in response to signals received from liquid-level sensors. Liquid-level detected in the liquid receiving chamber may be used to activate drainage of the liquid receiving chamber after activating opening of the outlet valve of the liquid receiving chamber to the outside of the system and closing of the valve on the tubing from the filter chamber to the liquid receiving chamber, and then closing the outlet valve of the liquid receiving chamber to the outside of the system and opening the valve on the tubing from the filter chamber to the liquid receiving chamber once the liquid receiving chamber is drained.

The liquid receiving chamber draining operation may be made manually. When using a manually operated system, a first level sensor may be used to generate a signal for the operator, as a protection feature. A second level sensor or may be used for generating an emergency alarm, as a backup to the first level sensor or in the event of a malfunction of the first sensor, so as to prompt the operator to stop the vacuum pump or other equipment supplied in filtered stream flow by the system for instance. In the event that notwithstanding the interruption of the vacuum pump or other equipment supplied in filtered stream flow by the system, some liquid enters the filter chamber, as a further protection feature, a ball lifted by the liquid may be used to close the entrance leading to the filter chamber so as to prevent possible damage.

The filtering elements may be cleaned manually and/or automatically directly without opening the system and without interrupting the operation of the vacuum pump or other equipment supplied in filtered stream flow by the system by having two such systems in parallel. A cleaning unit may be used.

The present system may be used to protect vacuum pumps in maple sugaring facilities or other sap harvesting facilities, in dairy farms, and in facilities unrelated to food production, in the oil industry for example.

Details on various embodiments in the present disclosure are given for illustrative purposes. Various possible combinations are possible.

The scope of the claims should not be limited by the embodiments set forth in the examples, but should be given the broadest interpretation consistent with the description as a whole.

The invention claimed is:

1. A filter system operating under vacuum conditions, comprising:

a flow stream input section, connected to a source of flow stream;

a filter section connected to said flow stream input section; and a flow stream output section connected with said filter section;

wherein said flow stream input section receives, at a flow stream inlet port thereof, from said source of flow stream, a flow stream comprising at least one of air, water, airborne droplets, moisture and gases, and directs the flow stream to said filter section, and from said filter section to said flow stream output section, the system delivering a filtered flow stream from said flow stream output section at a flow stream output thereof;

wherein said filter section comprises filter elements, a number and a size of the filter elements being selected to optimize a flow stream volume within the filter section and a contact surface between the flow stream and surfaces of the filter elements, and to optimize flow of a liquid phase along the surfaces of the filter elements; the filter elements capture a liquid phase from the flow stream, and direct the liquid phase from the filter section to the flow stream input section, the flow stream input section directing the liquid phase out of the system at a liquid output thereof, the system further comprising a sump section, said sump section comprising a sump inlet port connected to an outlet drain port, a sump inlet shutoff valve, a sump outlet drain port and a sump outlet shutoff valve.

2. The filter system of claim 1, wherein said output section is connected to an air inlet of a vacuum pump, and the system delivers the filtered flow stream from said flow stream output section to said vacuum pump.

3. The filter system of claim 1, wherein the flow stream input section comprises a prefilter, said prefilter removing contaminants from the flow stream upstream of the filter section.

4. The filter system of claim 1, comprising a prefilter upstream of the inlet port of the flow stream input section, said prefilter removing contaminants from the flow stream upstream of the system.

5. The filter system of claim 1, wherein said sump section receives the liquid phase from the filter section when the sump shutoff valve is closed, and the sump inlet shutoff valve is open between the outlet drain port of the flow stream input section and the sump inlet port of the sump section.

6. The filter system of claim 1, wherein said sump section receives the liquid phase from the filter section when the sump shutoff valve of the sump outlet drain port is closed and the sump inlet shutoff valve is open between the outlet drain port of the flow stream input section and the sump inlet port, and said sump section is drained when the sump inlet shutoff valve is closed between the outlet drain port of the flow stream input section and the sump inlet port and the sump outlet shutoff valve of the sump outlet drain port is open.

7. The filter system of claim 1, wherein the liquid phase captured on outer surfaces of the filter elements flowing along the outer surfaces of the filter elements from the filter section to the flow stream input section, and then to said sump section when the sump outlet shutoff valve of the sump outlet drain port is closed and the sump inlet shutoff valve is open between the outlet drain port of the flow stream input section and the sump inlet port.

8. The filter system of claim 1, the liquid phase captured on outer surfaces of the filter elements flowing along the outer surfaces of the filter elements from the filter section to the flow stream input section, and then to said sump section when the sump outlet shutoff valve of the sump outlet drain port is closed and the sump inlet shutoff valve is open between the outlet drain port of the flow stream input section and the sump inlet port, and wherein the sump outlet shutoff valve of the sump outlet drain port and the sump inlet shutoff valve are remotely controlled.

9. The filter system of claim 1, the liquid phase captured on outer surfaces of the filter elements flowing along the outer surfaces of the filter elements from the filter section to the flow stream input section, and then to said sump section when the sump outlet shutoff valve of the sump outlet drain port is closed and the sump inlet shutoff valve is open between the outlet drain port of the flow stream input section and the sump inlet port, and wherein the sump outlet shutoff valve of the sump outlet drain port and the sump inlet shutoff valve are connected to a control module through a respective communication link for remote control thereof.

10. The filter system of claim 1, wherein the filter elements are tubes positioned parallel to one another, and the flow stream is forced from said flow stream input section between said tubes within said filter chamber and to said output section.

11. The filter system of claim 1, comprising at least one liquid level sensor selectively positioned to monitor a liquid level inside the flow stream input section.

12. The filter system of claim 1, wherein a size and a geometry of the filter elements are selected according to an average velocity of the flow stream at the flow stream inlet port of the flow stream input section, to yield and average velocity of the flow stream in the filter section selected for allowing the liquid phase in the flow stream to form droplets on the surfaces of the filter elements, and the droplets to flow along the surfaces of the filter elements to the flow stream input section.

13. The filter system of claim 1, wherein a porosity of the filter elements is selected according to the flow stream entering the system at the flow stream inlet port thereof.

14. The filter system of claim 1, wherein the filter elements are made in a material selected for coalescence of the liquid phase of the flow stream on the surfaces thereof.

15. The filter system of claim 1, wherein the filter elements are made in at least one of: frittered plastics, sintered ceramics powders and sintered metallic powders.

16. The filter system of claim 1, further comprising a cleaning unit comprising a pressurized liquid supply, wherein said cleaning unit directs pressurized liquid inside the filter elements, the pressurized liquid once passed inside the filter elements draining into the flow stream input section and out of the flow stream input section out of the system with contaminants removed from inner surfaces of the filter elements.

17. The filter system of claim 1, further comprising a cleaning unit comprising a pressurized liquid supply and a pressurized air supply, wherein said cleaning unit directs pressurized liquid inside the filter elements, the pressurized liquid once passed inside the filter elements draining into the flow stream input section and out of the flow stream input section out of the system with contaminants removed from inner surfaces of the filter elements; and said cleaning unit directs pressurized through the filter section to the flow stream input section in a countercurrent direction to a direction of the flow stream from said flow stream input section to said filter section.

18. The filter system of claim 1, further comprising a draining section and a reservoir, the draining section being sealed between the filter section and the flow stream input section, the draining section being connected to the filter section by a first tubing for receiving liquid drained from inside of the filter elements; the reservoir being connected to said draining section by a second tubing for receiving liquid from said draining section.

19. The filter system of claim 1, further comprising a draining section and a reservoir, the draining section being sealed between the filter section and the flow stream input section, the draining section being connected to the filter section by a first tubing; the reservoir being connected to said draining section by a second tubing with a valve between an outlet drain port of the draining section and an inlet port of the reservoir, the reservoir comprising a reservoir outlet port valve;

wherein liquid captured on outer surfaces of the filter elements flows along the outer surfaces of the filter elements from the filter section to the flow stream input section, and then to said sump section when the sump outlet shutoff valve of the sump outlet drain port is closed and the sump inlet shutoff valve is open between the outlet drain port of the flow stream input section and the sump inlet port;

wherein, when the valve between the outlet drain port of the draining section and the inlet port of the reservoir is closed, the draining section receives liquid drained from inside of the filter elements; and when the reservoir outlet port valve is closed and the valve between the outlet drain port of the draining section and the inlet port of the reservoir is opened, the reservoir receives the liquid from the draining section, independently of the liquid from outside surfaces of the filter elements; and wherein the valve between the outlet drain port of the draining section and the inlet port of the reservoir and the sump inlet shutoff valve between the outlet drain port of the input section and the inlet port of the sump section are closed to drain the reservoir and the sump section as the sump outlet shutoff valve and the reservoir outlet port valve are open; and, once the reservoir and the sump section are drained, the sump outlet shutoff valve and the reservoir outlet port valve are closed.

20. A filter system operating under vacuum conditions, comprising:

a flow stream input section, connected to a source of flow stream;

a filter section connected to said flow stream input section; and a flow stream output section connected with said filter section;

wherein said flow stream input section receives, at a flow stream inlet port thereof, from said source of flow stream, a flow stream comprising at least one of air, water, airborne droplets, moisture and gases, and directs the flow stream to said filter section, and from said filter section to said flow stream output section, the system delivering a filtered flow stream from said flow stream output section at a flow stream output thereof;

wherein said filter section comprises filter elements, a number and a size of the filter elements being selected to optimize a flow stream volume within the filter section and a contact surface between the flow stream and surfaces of the filter elements, and to optimize flow of a liquid phase along the surfaces of the filter elements; the filter elements capture a liquid phase from the flow stream, and direct the liquid phase from the filter section to the flow stream input section, the flow stream input section directing the liquid phase out of the system at a liquid output thereof;

the system further comprising a draining section and a reservoir, the draining section being sealed between the filter section and the flow stream input section by the filter elements resting on a bottom plate of the filter section and a bottom plate of the draining section; the draining section being connected to the filter section by a first tubing; the reservoir being connected to said draining section by a second tubing with a valve between an outlet drain port of the draining section and an inlet port of the reservoir, the reservoir comprising a reservoir outlet port valve, and wherein, when the valve between the outlet drain port of the draining section and the inlet port of the reservoir is closed, the draining section receives a liquid drained from inside of the filter elements; and when the reservoir outlet port valve is closed and the valve between the outlet drain port of the draining section and the inlet port of the reservoir is opened, the reservoir receives the liquid from the draining section, independently of liquid from outside surfaces of the filter elements.

* * * * *